United States Patent [19]
Kamon

[11] Patent Number: 5,920,646
[45] Date of Patent: Jul. 6, 1999

[54] DIGITAL COPYING APPARATUS CAPABLE OF FORMING A SUPERIOR QUALITY IMAGE WITH A REDUCED AMOUNT OF MEMORY

[75] Inventor: Kouichi Kamon, Yokohama, Japan

[73] Assignee: Ricoh Company, Ltd., Tokyo, Japan

[21] Appl. No.: 08/811,045

[22] Filed: Mar. 4, 1997

[30] Foreign Application Priority Data

Mar. 4, 1996 [JP] Japan .................................... 8-046423

[51] Int. Cl.$^6$ ................................ G06K 9/34; G06K 9/40
[52] U.S. Cl. ........................ 382/173; 382/176; 382/254; 382/269
[58] Field of Search .................................... 358/447, 453, 358/465, 462, 456, 298; 382/269, 176, 271, 259, 173

[56] References Cited

U.S. PATENT DOCUMENTS

| | | | |
|---|---|---|---|
| 5,317,419 | 5/1994 | Koizumi | 358/462 |
| 5,506,699 | 4/1996 | Wong | 358/456 |
| 5,630,026 | 5/1997 | Ogletree et al. | 395/107 |

*Primary Examiner*—Jose L. Couso
*Assistant Examiner*—Dmitry A. Novik
*Attorney, Agent, or Firm*—Oblon, Spivak, McClelland, Maier & Neustadt, P.C

[57] ABSTRACT

A digital copying apparatus provides high quality copy images suitable for an original document image while reducing a necessary capacity of a memory for storing image data. An image signal read by an image reading unit is binarized by a binary gradation processing unit in a gradation processing unit and is stored in a memory unit. Then, binary image data read from the memory unit is applied to a multi-value processing unit, wherein a pattern recognition unit determines whether or not the binary image data includes a pixel which requires a jagged line correction, and a halftone detector detects a halftone region in the binary image data. A determination unit and a selector select jagged line correction data output from a pattern memory and multi-valued image data converted from the binary image data by a multi-value filter. The selected data is output to an image forming unit.

16 Claims, 7 Drawing Sheets

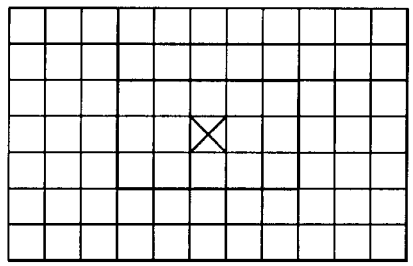
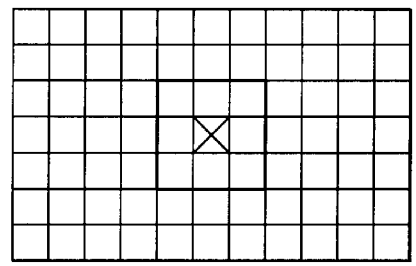
FIG. 7A          FIG. 7B
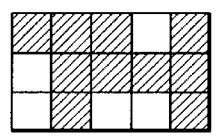
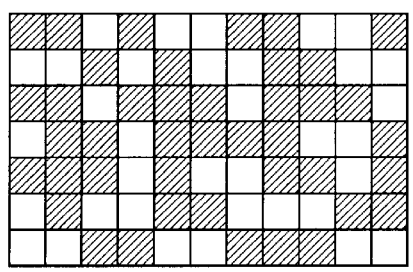
FIG. 8
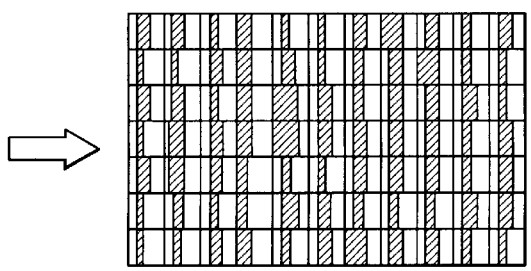
FIG. 9

DIGITAL COPYING APPARATUS CAPABLE OF FORMING A SUPERIOR QUALITY IMAGE WITH A REDUCED AMOUNT OF MEMORY

BACKGROUND OF THE INVENTION

1. Field of the Invention

The present invention relates generally to a digital copying apparatus, and more particularly to a digital copying apparatus of a type including an image reading unit, such as an image scanner, and an image forming unit, such as a laser printer, which is adapted to reduce a required capacity of memory for storing image data and simultaneously to improve the quality of copied images.

2. Discussion of the Background

A digital copying apparatus typically reads a document by an image reading unit such as an image scanner to generate an image signal which is quantized and arranged in a bit map (dot matrix) form in a video memory region in a memory (RAM) as binary data. The binary data is sequentially read from the video memory region and sent to an image forming unit (an engine for driving a laser printer, or the like) as video data for forming an image on recording paper in an electrophotographic method.

In the image signal processing mentioned above, when an image to be formed is represented by analog data, the analog data may be continuous in any direction. However, a digital bit map image, which is produced by quantizing an analog image and arranging quantized binary data in a dot matrix, can only be changed on a dot-by-dot basis stepwisely in orthogonal directions of the dot matrix, so that skewed portions may appear in a resulting image. Particularly, straight lines and smooth curves drawn at any angle to the orthogonal directions of the dot matrix would be produced as jagged lines in a resulting image. This phenomenon is known as "jag" in the art. The jag causes difficulties in accurately forming the same characters and images (particularly outlines of images) as the original image or in forming any characters and images in a desired style.

An effective method for suppressing skewed portions in a bit map image may be implemented by reducing a size of data constituting the dot matrix, to thereby increase the density of the dot matrix and accordingly enhance the resolution of the bit map image. An enhanced resolution, however, results in a significant increase in cost. For example, when a two-dimensional bit map matrix having a size of 300×300 dpi (dot per inch) is doubled in resolution, the resulting bit map matrix has a size of 600×600 dpi. However, a memory capacity four times larger and a data processing capability, or a data processing speed, four times higher are required for processing data associated with this larger size bit map matrix.

Other methods for suppressing skewed images involve the use of interpolation techniques for interpolating corners of jagged lines to produce a continuous sloping line, or averaging techniques for averaging a brightness of adjacent dots to obscure edges of jagged lines. While these methods can eliminate jagged lines, they also remove fine shapes other than the jagged lines, whereby the contrast and the resolution of resulting images are degraded.

To solve the problems mentioned above, techniques have been developed for selectively adding and removing smaller dots having a dot width smaller than that of a standard dot to and from particular portions of a dot pattern arranged in a bit map matrix to smooth jagged lines. These techniques are described, for example, in U.S. Pat. No. 4,544,922. For realizing such techniques, pattern recognition, template matching, and so on, are utilized as an approach to detect such particular portions subject to the correction in a dot pattern.

While the techniques mentioned above can smooth jagged lines without degrading a contrast of an entire image, to thereby improve image quality, such techniques must perform pattern recognition or template matching on all positions in an arbitrary bit map image and correct each dot in accordance with results of the pattern recognition or the template matching. Thus, a processing apparatus for implementing such techniques is extremely costly and requires a long time for the processing associated with the pattern recognition or the template matching.

To solve the problems mentioned above, Japanese Laid-open Patent Application No. 5-207282 proposes a new image data processing method and apparatus. Specifically, the image data processing method is intended to correct jagged outlines of images in image data arranged in a bit map matrix to improve the image quality as well as to reduce the amount of data to be previously stored in a memory to a minimally required amount. A microprocessor or the like is utilized to determine dots within the image data which requires a correction and to apply correction data to the dots which require the correction. Since the determination can be made by simple processing of the microprocessor, the data correction can be completed in an extremely short time.

More specifically explaining, the image data processing method disclosed in the above patent document 5-207282 recognizes a line shape of a boundary between a black dot region and a white dot region in image data arranged in a bit map matrix, replaces features of the line shape with code information formed of a plurality of bits for each of associated dots, utilizes at least a portion of the code information to determine whether or not each of the dots requires a correction, and applies a correction in accordance with the code information to the dots determined to require the correction.

The code information is representative of the features of the line shape and includes a code indicative of an inclining direction of the line, a code indicative of a degree of the inclination, and a code indicative of a position from a first dot of the line continuous in a horizontal or vertical direction of a dot of interest.

In addition, data on each dot included in a predetermined region centered at the dot of interest in the image data is extracted through a window, and the window is divided into a core region including a central portion of the window and a plurality of peripheral regions around the core region. The code information is generated based on a combination of recognition information derived by image data extracted from the core region and recognition information derived by image data extracted from one or more peripheral regions specified depending on the results of recognition based on the image data extracted from the core region.

An image data processing apparatus for implementing the foregoing image data processing method includes a window for extracting data on each dot in a predetermined region centered at a dot of interest in image data arranged in a bit map matrix; a pattern recognition unit for recognizing the line shape of a boundary between a black dot region and a white dot region in the image data to generate code information formed of a plurality of bits and representing features of the line shape recognized with respect to the dot of interest; a determination unit for determining whether or not a dot requires a correction by utilizing at least a portion of the code information; and a pattern memory for reading and outputting previously stored correction data at an address specified by the code information generated by the pattern recognition unit.

The pattern recognition unit generates, as the code information representative of the features of a line shape, code information including a code indicative of an inclining direction of the line, a code indicative of the degree of the inclination, and a code indicative of a position from a first dot of the line continuous in a horizontal or vertical direction of a dot of interest.

In the image data processing apparatus, the window is divided into a core region including a central portion thereof and a plurality of peripheral regions around the core region. The pattern recognition unit includes a core region recognition unit for recognizing image data extracted from the core region; a peripheral region recognition region for recognizing image data extracted from one or more peripheral regions specified depending on the results of recognition based on the image data extracted from the core region; and a unit for generating the code information based on a combination of recognition information generated by the core region recognition unit and recognition information generated by the peripheral region recognition unit.

According to the image data processing method and apparatus described above, the line shape of a boundary between a black dot region and a white dot region (an outline of a character or the like) in image data arranged in a bit map matrix is recognized, and data on the recognized line shape is replaced with code information formed of a plurality of bits for each of dots included in the boundary. At least a portion of the code information is utilized to determine whether or not each of the dots requires a correction, and a correction in accordance with the code information is made to the dots which require the correction, thereby eliminating the need for previously creating and storing all possible feature patterns requiring a correction as templates. Thus, the determination of dots requiring a correction and the assignment of correction data to the dots requiring a correction can be simply accomplished in a largely reduced time by the use of the code information.

The image data processing method and the image data processing apparatus as described above improve image quality by correcting jagged outlines in image data arranged in a bit map matrix. For this purpose, a required amount of data previously stored in a memory is reduced, and the determination of dots requiring a correction within the image data and the application of correction data to the dots requiring the correction are implemented by simple processing of a CPU or the like, thus making it possible to readily carry out necessary determination and processing associated with the correction of jagged lines in an extremely reduced time.

Japanese Laid-open Patent Application No. 63-56063 proposes a method of determining whether a pixel of interest belongs to a character image region or a halftone image region (identifying a region to which the pixel of interest belongs) based on a ratio of a density level of the pixel of interest to a density level of surrounding pixels.

Further, Japanese Laid-open Patent Application No. 3-70267 describes improvements in gradation characteristic and resolution of a halftone image. Specifically, a binarizing operation generates binary data having a resolution higher than an output resolution, and the binary data is shaped in conformity to the output resolution to improve the gradation characteristic and the resolution of a halftone image.

Furthermore, Japanese Laid-open Patent Application No. 4-156064 describes techniques which determine an edge when a density of a pixel of interest is less than an average density of pixels therearound, and which techniques control error diffusion in a binarizer circuit to prevent a white blank in an image which is more likely to occur in an edge portion having a low density.

A large number of methods have thus been proposed, as mentioned above, for dividing an image into a plurality of regions before the image is binarized for storing associated image data in a memory and for performing processing to enhance the image quality depending on the type of image. However, the division of an image into plural regions before binarization causes an inconvenience that a jagged line to be corrected cannot be distinguished from a halftone region so that a selective correction cannot be made only for a jagged oblique line. Also, while a method has been proposed to change binarizing techniques themselves based on the result of a division of an image, the binarization only is not sufficient to expect an improved image quality. Further, when an engine of a laser printer has a gradation function through modulation of laser diodes, effective utilization of the function is desired.

SUMMARY OF THE INVENTION

The present invention has been made in view of the current situation of image processing associated with a digital copying apparatus implying problems as mentioned above.

Accordingly, an object of the invention is to provide a novel digital copying apparatus using a page memory which is capable of reducing a cost of a memory largely contributing to an entire system cost and improving the image quality even with binary image data. The reduction in cost of memory is carried out by storing binary image data in the memory while a portion requiring a jagged line correction is allowed to undergo the jagged line correction. When a printer unit has a higher gradation representing capability than that realized by binary image data, binary image data is converted into multi-valued image data by an appropriate method selected on the basis of a relationship between a pixel of interest and surrounding pixels to improve the quality of images represented by binary image data.

Another object of the present invention is to provide a novel digital copying apparatus which is capable of selecting one of a plurality of multi-value converting units depending on a copy mode and a system configuration to achieve an image quality suitable to a particular purpose.

Still another object of the present invention is to provide a novel digital copying apparatus which is capable of detecting a once binarized halftone portion to perform multi-value processing inherent to a halftone representation on such a binarized portion to improve the image quality.

To achieve the above objects, the present invention provides a novel digital copying apparatus including an image reading unit for reading a document image to generate an electrical image signal representing the document image, a signal processing unit for signal processing the image signal generated by the image reading unit, and an image forming unit for forming an image on a sheet in accordance with the image signal processed by the signal processing unit.

Preferably, the signal processing unit includes:
 (a) a binarizing unit for binarizing the image signal generated by the image reading unit;
 (b) a memory for storing binarized image data generated by the binarizing unit;

(c) a pattern recognition unit for performing pattern recognition to determine whether or not the image signal includes a pixel which requires a jagged line correction based on the binarized image data read from the memory;

(d) a jagged line correction executing unit for executing jagged line correction to a pixel determined to require the jagged line correction;

(e) a halftone detecting unit for detecting a halftone region from the binarized image data;

(f) a multi-value processing unit including a multi-value filter for converting the binarized image data into multi-valued image data; and (g) an output selecting unit for selectively outputting output image data of the jagged line correction unit and output image data of the multi-value processing unit based on a determination result provided by the pattern recognition unit and a detection result provided by the halftone detecting unit.

Further, the output selecting unit may include a plurality of determination units for selecting output image data based on a determination result provided by the pattern recognition unit and a detection result provided by the halftone detecting unit, and a mode setting unit for selectively setting one of the plurality of determination units. The halftone detecting unit may include a unit for arranging binarized image data read from the memory in a two-dimensional matrix having a size of M×N, a unit for dividing the M×N matrix region into a predetermined number of, e.g. four, sub-regions, each of the predetermined number of sub-regions including a pixel of interest located at a center of the M×N matrix region, and for counting the number of black pixels in each of the predetermined number of sub-regions, a first determination unit for determining whether or not the pixel of interest falls under a halftone portion based on the difference between a maximum value and a minimum value of the predetermined number of sub-regions, a second determination unit for determining whether or not the pixel of interest falls under a halftone portion based on a difference in a number of black pixels between two pairs of diagonally opposing ones of the predetermined number of sub-regions, and a unit for finally determining whether or not the pixel of interest falls under a halftone portion from determination results of the first and second determination units.

In this case, the multi-value processing unit may include a unit for converting the binarized image data into multi-valued image data using a two-dimensional multi-value filter having a size smaller than the two-dimensional matrix having the size of M×N for arranging binarized image data therein, such that the output selecting unit can select and output multi-valued image data converted by the multi-value processing unit for a pixel which is detected to belong to a halftone portion.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 7A and 7B are diagrams each illustrating a region in the image data of the two-dimensional space subjected to filtering and an example of a multi-value filter;

FIG. 8 is a diagram showing an example of how a multi-value level is calculated by the multi-value filter illustrated in FIG. 7A;

FIG. 9 is a diagram conceptually illustrating an example of a multi-valued binary halftone image.

DESCRIPTION OF THE PREFERRED EMBODIMENTS

Figure 1A:
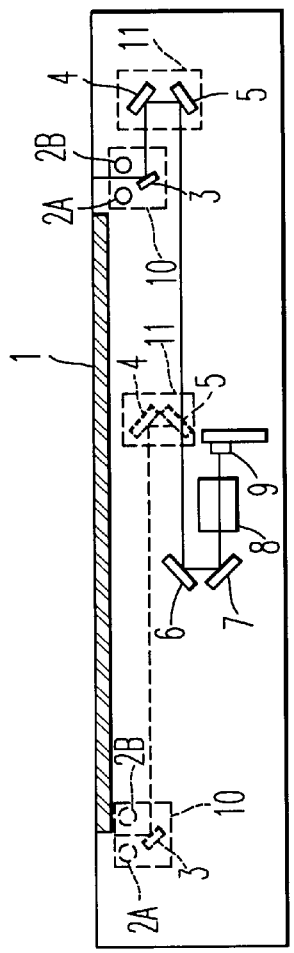
FIG. 1 is a schematic cross-sectional view generally illustrating a mechanical structure of a digital copying apparatus which embodies the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 1B:
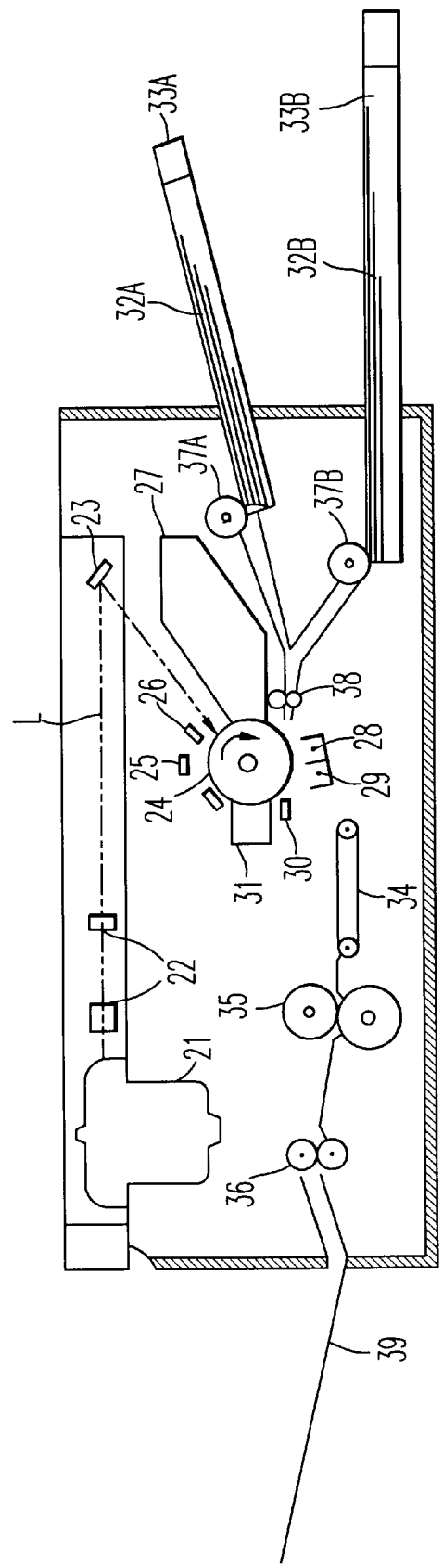

Referring now to the drawings, wherein like reference numerals designate identical or corresponding parts throughout the several views, and more particularly to FIG. 1 thereof, a schematic cross-sectional view generally illustrating a mechanical structure of an exemplary digital copying apparatus which embodies the present invention is illustrated.

The digital copying apparatus shown in FIG. 1 includes an image scanner A serving as a document reading unit and a laser printer B serving as an image forming unit. While the image scanner A and the laser printer B are integrally constructed in many cases, they may be separately arranged and only electrically connected.

The image scanner A includes an image reading unit for reading a document image to generate an electrical image signal, while the laser printer 3 includes an image forming unit (engine unit) for forming an image on paper in accordance with an image signal after being processed by a signal processing unit. In this embodiment, the signal processing unit for performing the signal processing on the image signal read by the image reading unit is divided into two sections which are separately disposed in the image scanner A and the laser printer B.

The image scanner A includes: a contact glass 1 on which a document to be read (not shown) is placed; light sources 2a, 2b, such as halogen lamps, for illuminating the document; a focusing optical system including mirrors 3, 4, 5, 6, 7 and a lens 8; and an image reading unit including a CCD image sensor 9 serving as an image reading device.

In operation, a lower surface (image surface) of a document placed on the contact glass 1 is illuminated by the light sources 2a, 2b such that light reflected from the document reaches a light receiving surface of the CCD image sensor 9 through the mirrors 3, 4, 5, 6, 7 and the lens 8 to focus the image of the document on the image sensor 9.

The light sources 2a, 2b and the mirror 3 are mounted in a first movable chamber 10 arranged for movement over an entire length of the contact glass 1 in a sub-scanning direction (right and left directions in FIG. 1) in parallel with and beneath the contact glass 1. Mirrors 4, 5 are mounted in a second movable chamber 11 arranged for movement over one half of the moving distance of the first movable chamber 10 in the sub-scanning direction in parallel with the contact glass 1 at a speed of one half of the speed of the first movable chamber 10.

A main scanning operation is performed by driving the CCD image sensor 9 itself in a main scanning direction. Specifically, the image of the read document placed on the contact glass 1 is read and transduced into an electrical image signal by the CCD image sensor 9. The light sources and the focusing optical systems mounted in the first and second movable chambers 10, 11 are moved in the sub-scanning direction as mentioned above to scan the entire document.

In this embodiment, a reading density is set at 16 pixels per millimeter (mm) for the main and sub-scanning operations, and documents of sizes up to A3 (297 mm×420 mm) can be read by the image scanner A.

The laser printer B serving as an image forming unit includes an image forming unit including a laser writing system, an image reproducing system, a paper folding system, and so on. The laser writing system includes a laser output unit 21, a focusing lens 22 and a mirror 23. The laser output unit 21 contains laser diodes serving as a laser light source and a polygon mirror driven by an electrical motor to rotate at a constant high speed.

A laser light beam L output from the laser writing system is irradiated to a photosensitive drum 24 in the image reproducing system. Around the photosensitive drum 24 there are positioned associated members such as a charger 25, an eraser 26, a developing unit 27, a pair of resist rollers 38, a transfer charger 28, a separating charger 29, a separating claw 30 and cleaning unit 31, all of which constitute the image reproducing system. In addition, a beam sensor (not shown) for generating a main scan synchronizing signal (MSYNC) is located at a position near one end of the photosensitive drum 24 which is irradiated with the laser light beam L.

The paper feeding system of the laser printer B has two paper feeding lines. A first paper feeding line feeds a recording sheet 32a stored in an upper paper feeding cassette 33a through a paper feeding roller 37a, while a second paper feeding line feeds a recording sheet 32b stored in a lower paper feeding cassette 33b through a paper feeding roller 37b.

The recording sheet 32a or 32b fed by the paper feeding roller 37a or 37b is once stopped when it abuts against the resist rollers 38, and then is sent to the photosensitive drum 24 by the resist rollers 38 at a timing synchronized with the progress of a recording process.

It should be noted that, although not shown in FIG. 1, the respective paper feeding lines are each provided with a recording sheet size sensor for sensing the size of the recording sheet 32a or 32b stored in the paper feeding cassette 33a or 33b, respectively.

Next, an image forming process in the laser printer B will be explained briefly.

The peripheral surface of the photosensitive drum 24 is rotatable in a direction indicated by the arrow in FIG. 1 and is uniformly charged at a high potential by the charger 25. When the peripheral surface is irradiated with the laser light beam L, the potential at the irradiated portions is reduced.

The laser light beam L is turned on and off in response to black and while dots on a recording image to be reproduced based on an image signal representing an image of a read document generated by the CCD image sensor 9 of the image Scanner A. Also, an energy of the laser beam L irradiated to the peripheral surface of the photosensitive drum 24 is controlled by pulse width modulation (PWM) or power modulation (PM).

As a result, a potential distribution corresponding to gradation levels of the recording image, i.e., an electrostatic latent image, is formed on the peripheral surface of the photosensitive drum 24. When a portion of drum 24 formed with the electrostatic latent image passes through a developing station including the developing unit 27, toner particles are attracted to the portion in accordance with the magnitude of the potential, whereby an electrostatic latent image is visualized as a toner image. The recording sheet 32a or 32b (hereinafter simply referred to as the "recording sheet 32") is fed to the portion of the photosensitive drum 24 formed with the toner image at a predetermined timing, and the toner image is transferred to the recording sheet 32 by action of the transfer charger 28.

Subsequently, the recording sheet 32 having the toner image transferred thereon is separated from the photosensitive drum 24 by the separating charger 29 and the separating claw 30. The separated recording sheet 32 is transported by a transporting belt 34 to a fixing roller 35 incorporating a heater, where the recording sheet is heated to fix the toner image thereon. Finally, the recording sheet 32 is discharged by a discharging roller 36 to a sheet tray 39.

Figure 2:
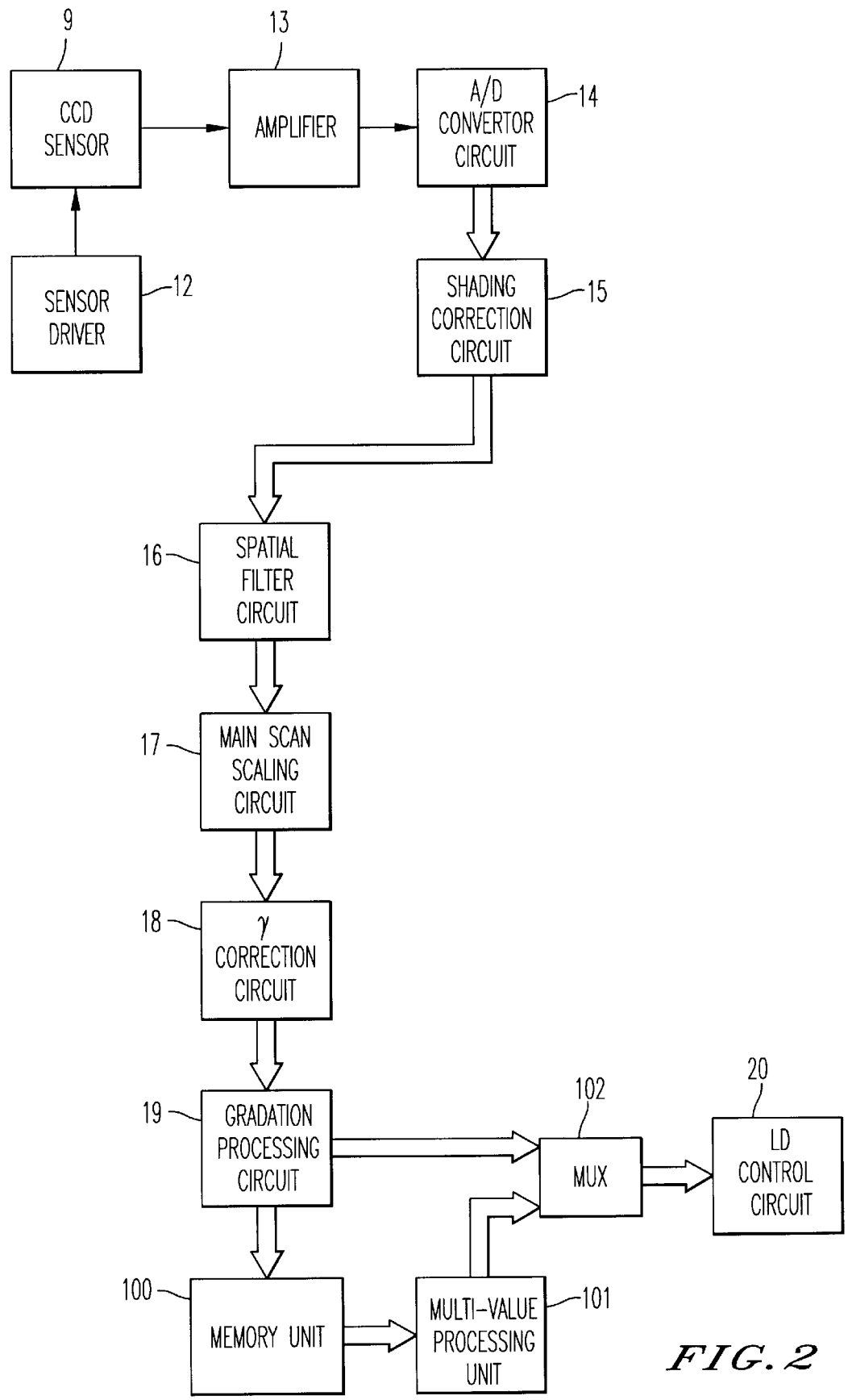
FIG. 2 is a block diagram for explaining image data processing in order in the digital copying apparatus illustrated in FIG. 1.

FIG. 2 is a block diagram for explaining the processing order in which image data is processed in the digital copying apparatus of the present invention. The illustrated system of FIG. 2 includes: a sensor driver circuit 12 for driving the CCD image sensor 9; an amplifier 13; an A/D converter circuit 14; a shading correction circuit 15; a spatial filter circuit 16; a main scan scaling circuit 17; a γ correction circuit 18; a gradation processing circuit 19; and a laser diode (LD) control circuit 20. In addition, arrowed thicker lines represent 2-bit image signals (data), and arrowed thicker lines represent 8-bit image signals (data).

As described above, an image signal read by the CCD image sensor 9 at a sampling density of 16 pixels/mm is first amplified by the amplifier 13 to have a predetermined voltage amplitude, and is then converted into digital data having $2^n$ levels of gradation ($2^8$=256 levels of gradation in this embodiment) per pixel by the A/C converter circuit 14.

The shading correction circuit 15 performs a shading correction for correcting uneven illumination by the light sources 2a, 2b, variations in sensitivity among respective elements of the CCD image sensor 9, and so on. The spatial filter circuit 16 performs an MTF (modulation transfer function) correction for improving the resolution of characters, line images, and so on, to remove signal noise, to effectuate a smoothing operation for improving the reproductivity of photographic images, and so on, and other associated processing. The main scan scaling circuit 17 performs two-dimensional real-time scaling, and subsequently the γ correction circuit 18 performs a γ correction in accordance with a density setting function.

The γ correction circuit 18 determines the density characteristic of a copy output corresponding to a density key on a manipulation panel for the density of a document image, and converts image data with a γ correction function corresponding to the density key on the manipulation panel for realizing the density characteristic.

The gradation processing circuit 19 further performs halftone processing and so on in accordance with an image quality setting function, and sends an image signal to the LD control circuit 20 through a multiplexer (MUX) 102. A connection between the image scanner A and the laser printer B, illustrated in FIG. 1, exists between the gradation processing circuit 19 and the LD control circuit 20.

Within the foregoing configuration illustrated in FIG. 2, a portion from the amplifier 13 to the multiplexer 102 constitutes the signal processing unit.

The LD control circuit 20 generates a lighting signal in accordance with the image signal applied thereto to drive the laser diodes.

Referring further to FIG. 2, the system also includes a bus for transferring image data to a memory unit 100 in parallel with a bus-routing from the gradation processing circuit 19 to the LD control circuit 20. The memory unit 100 is used for providing a number of useful functions. For example, the memory unit 100 stores at least one page portion of a read image so as to enable a plurality of copies to be produced from a single document only with a single reading operation. If a direction in which a document is placed on the contact glass 1 is different from a direction in which a recording sheet is fed (for example, an A4 document is placed in the horizontal direction on the contact glass 1, while A4 recording sheets are set in a cassette only in the vertical direction), image data can be rotated in the memory unit 100. When a plurality of copies are to be produced from a plurality of documents, the documents can be sorted on the memory unit 100 such that the copies are output in a sorted order.

The memory unit 100 functions as a memory for storing image data in a memory (RAM), and this memory is required to have a large capacity. To reduce a required capacity of the memory even by a small amount, image data is compressed, and the number of bits of image data is reduced.

In the embodiment described below, image data is converted into data having eight bits per pixel by the A/C converter circuit 14. In addition, the number of bits may be further changed by processing performed on the image data up to the gradation processing circuit 19. For example, if image data is binarized by the gradation processing circuit 19, the image data will have one bit per pixel. Alternatively, if image data undergoes multi-value dither processing in the gradation processing circuit, the image data will have four bits per pixel, in which case a maximum of 256 levels of gradation representation can be achieved in units of 4×4 pixels.

In addition, a final number of bits constituting the image data depends on the gradation representing capability of a particular laser printer serving as an output apparatus. In this embodiment, laser diode modulation processing can be set by eight bits per pixel, and the phase of a driving waveform for driving the laser diodes can also be set at an appropriate position (left shift, right shift, and center pulses, later referred to with reference to FIG. 10).

In the embodiment described below, assume that all data stored in the memory unit 100 is binarized. The binarization may be implemented by simple binarization using a fixed threshold value, dither processing, binarization by error diffusion, and so on. In other words, the gradation processing circuit 19 corresponds to a binarizing unit.

The modulation of the capability to drive laser diodes for image data of one pixel can be assigned by 10 bits, including eight bits for the gradation of image data, i.e., luminance, and two bits for the phase of the driving waveform for driving the laser diodes. In other words, the modulation capability is provided by a total of ten bits. In this embodiment, as the phase of the driving waveform, a left-shift phase, a right-shift phase, and a center phase are used as will be described below with reference to FIG. 10. Thus, the LD control circuit 20 is applied with 10-bit data. To apply such 10-bit data to the LD control circuit 20, a multi-value processing circuit 101 requires a function of converting data of one bit per pixel stored in the memory unit 100 into a 10-bit form.

Figure 3:
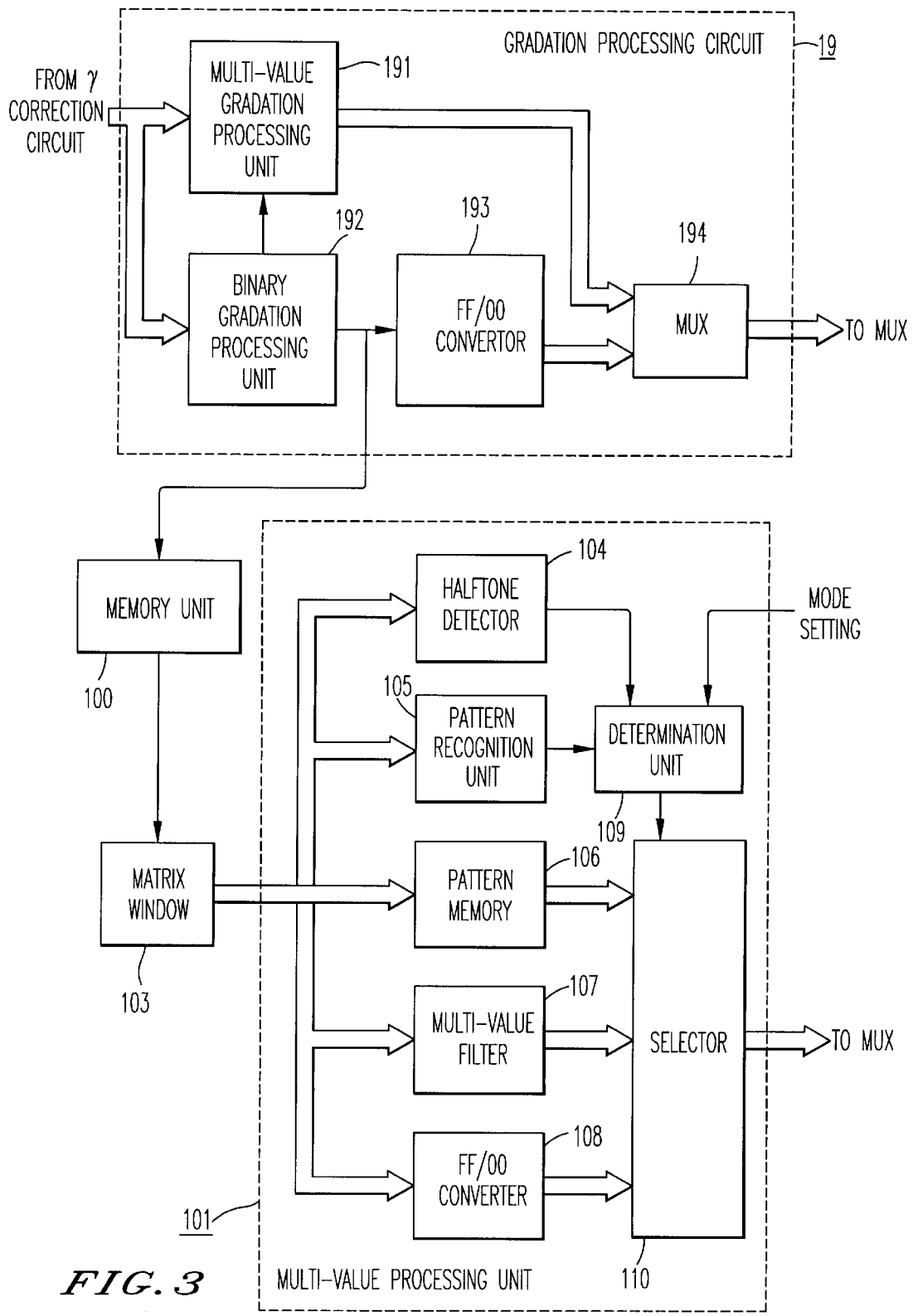
FIG. 3 is a block diagram illustrating an internal configuration of a gradation processing circuit and a multi-value processing unit in FIG. 2.

FIG. 3 is a block diagram illustrating an internal configuration of the gradation processing circuit 19 and the multi-value processing circuit 101 of FIG. 2. Also in FIG. 3, arrowed thin lines represent 2-bit image signals (data), while arrowed thicker lines represent 8-bit image signals (data).

The gradation processing circuit 19 includes a multi-value gradation processing unit 191, a binary gradation processing unit 192, an FF/00 converter 193 and a multiplexer (MUX) 194. Image data is processed by the binary gradation processing unit 102 so that the gradation of each pixel is represented by binary data. While the binary image data thus processed is sent to and stored in the memory unit 100 as it is, the binary image data is FF/00 converted by the FF/00 converter 193 before it is sent to the LD control circuit 20. The FF/00 conversion refers to a conversion of binary data into 10-bit data.

Specifically, as to the luminance represented by a binary value (1/0), "1" indicative of black is converted into 8-bit value "FF" indicative of all black, while "0" indicative of white is converted into 8-bit "00" indicative of all white. In this event, the two bits for setting the phase may take any value. This is because the phase does not exert any influence on the gradation since the luminance here is set to all white ("00") or all black ("FF"). Thus, "0" is sent for convenience.

In addition to the simple FF/00 conversion described above, more complicated processing may be employed. For example, if a pixel of interest is "1" and an adjacent pixel on the left is "0", an intermediate value, for example "80h" or the like, is assigned instead of "FF". In this event, since the adjacent pixel on the left is "0", "right-shift" may be specified for the phase. Conversely, when a pixel of interest is "1" and the adjacent pixel on the right in "0", the phase may be set to "left-shift".

In such a case, the luminance data may take one of three values: "00", "FF" and "80H". The value of a black pixel is reduced when an image is changed from white to black or from white to black. This technique may be applied for correcting lines when the diameter of the laser beam becomes larger than a predetermined value due to aging changes or the like to cause fatter lines to appear on a resulting image.

For directly sending image data from the gradation processing circuit 19 to the LD control circuit 20 without using the memory unit 100, the FF/00 converter 193 selects image data derived after multi-value gradation processing performed by the multi-value gradation processing unit 191 or 10-bit image data generated by converting binary data resulting from the binary gradation processing performed by the binary gradation processing unit 192 into 10-bit image data. Selected data is output from the gradation processing circuit 19.

Image data stored in the memory unit 100 in the format of one bit per pixel must be converted into 10-bit data in a similar manner after it is read from the memory unit 100 and before it is sent to the LD control circuit 20. This data conversion is performed by the multi-value processing circuit 101. Also, the multiplexer 102 illustrated in FIG. 2 switches image data when the memory unit 100 is used and when the memory unit 100 is not used.

The multi-value processing unit 101 includes, as illustrated in FIG. 3, a matrix window 103, a halftone detector 104, a pattern recognition unit 105, a pattern memory 106, a multi-value filter 107, an FF/00 converter 108, a determination unit 109 and a selector 110. The multi-value processing unit 101 can perform the multi-value processing in three different modes.

A first mode is for a jagged line correction which may be applied to oblique lines in a binary image. A second mode is for an improvement in gradation characteristic for a halftone image. A third mode is for the aforementioned FF/00 conversion. These three modes provided by the multi-value processing unit 101 may be switched depending on a particular purpose such that the most suitable one is applied. Alternatively, these modes may be adoptively switched within a single page when a halftone portion or a jagged line is detected in the page.

The pattern recognition unit 105 utilizes a pattern recognition technique to determine from binary image data read from the memory unit 100 whether or not each pixel requires a jagged line correction. For a pixel determined to require a jagged line correction, the pattern recognition unit 105 reads correction data from the pattern memory 106 serving as the jagged line correction unit to perform the jagged line correction on the pixel, and sends the determination result to the determination unit 109.

The pattern recognition unit 103 for detecting a jagged line and the pattern memory 106 serving as the jagged line correction unit are implemented by known techniques, such as described in the aforementioned Japanese Laid-open Patent Application No. 5-207282.

More specifically, the image data processing method described in JP-A No. 5-207282 recognizes the line shape of a boundary between a black dot region and a white dot region in image data arranged in a bit map matrix, replaces features of the recognized line shape with code information formed of a plurality of bits for each of associated dots, utilizes at least a portion of the code information to determine whether or not a pixel of interest requires a correction (whether or not the pixel is included in a jagged oblique boundary subjected to the jagged line correction), and reads correction data from the pattern memory 106 for a pixel determined to require the correction at an address specified by the code information.

The code information representative of the features of the line shape includes a code indicative of an inclining direction of the line, a code indicative of a degree of the inclination, and a code indicative of a position from the first dot of the line continuous in a horizontal or vertical direction of a dot of interest. In addition, data on each pixel included in a predetermined region centered at the pixel of interest in the image data is extracted through a window, and the window is divided into a core region including a central portion thereof and a plurality of peripheral regions around the core region. The code information in generated based on a combination of recognition information derived by image data extracted from the core region and recognition information derived by image data extracted from one or more peripheral regions specified depending on the results of recognition based on the image data extracted from the core region.

The foregoing jagged line detection and jagged line correction can eliminate the need for previously creating and storing all possible feature patterns requiring a correction as templates and simply determine dots requiring a correction and correction data to be applied to the dots requiring the correction in a largely reduced time using the code information.

The FF/00 converter 108 converts binary image data into a 10-bit format, similarly to the aforementioned FF/00 converter 193. While the FF/00 converter 108 basically converts a binary code "1" into "FF" and "0" into "00", a conversion from binary image data into trinary image data using the value of an adjacent pixel may also be included in this converter 108.

Next, the matrix window 103, the halftone detector 104, and the multi-value filter 107 will be described with reference to FIGS. 4 and 5.

Figure 4:
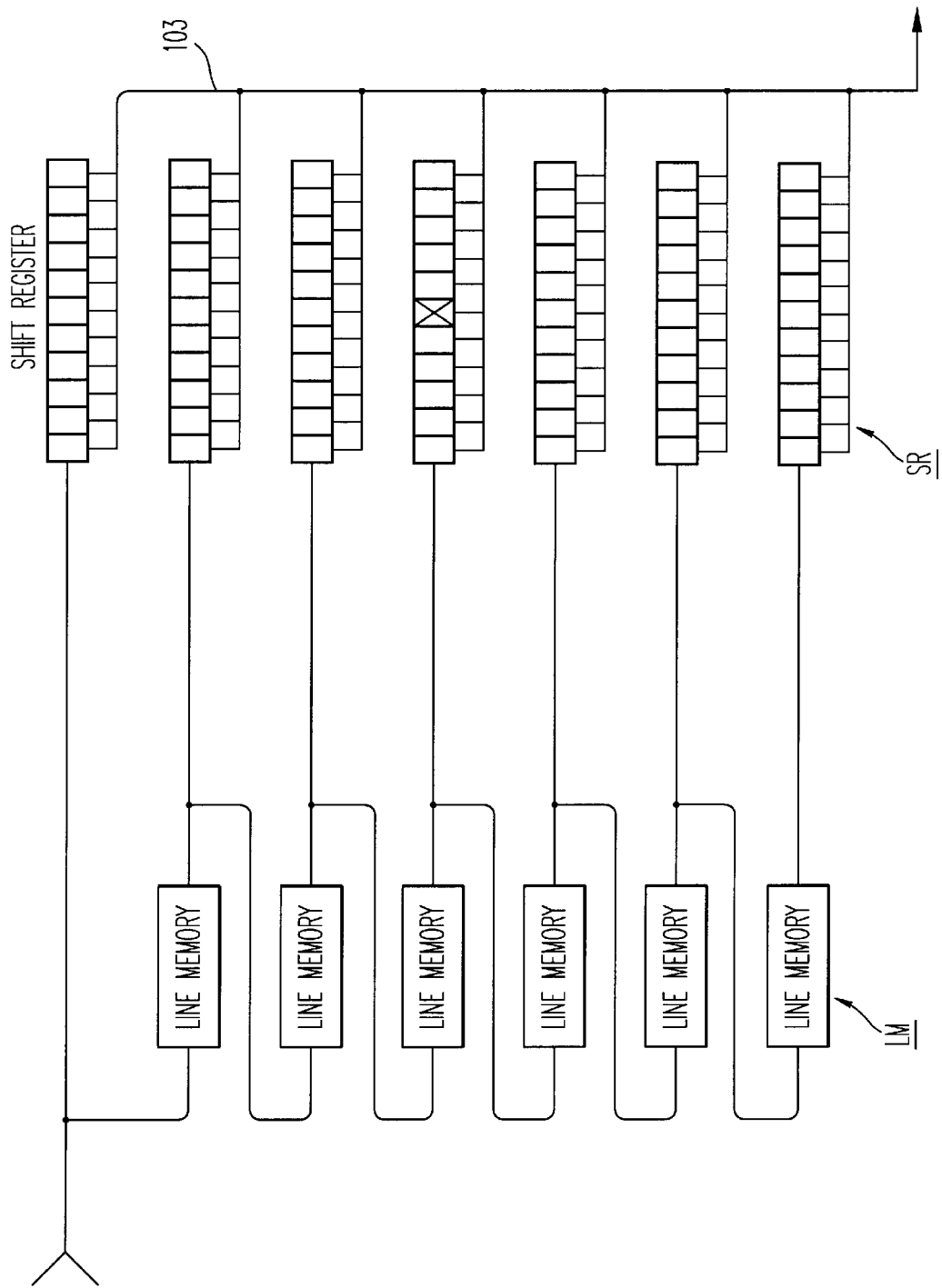
FIG. 4 is a block diagram illustrating an exemplary configuration of a matrix window in FIG. 3.

First, the matrix window 103, generally configured as illustrated in FIG. 4, creates a two-dimensional space for neighboring processing utilized not only by the halftone detector 104 and the multi-value filter 107, but also by the pattern recognition unit 105 for detecting a jagged line. Specifically, the matrix window 103 includes a group LM of line memories used for creating a space in the sub-scanning direction and a group SR of shift registers used for creating a space in the main scanning direction.

Figure 5:
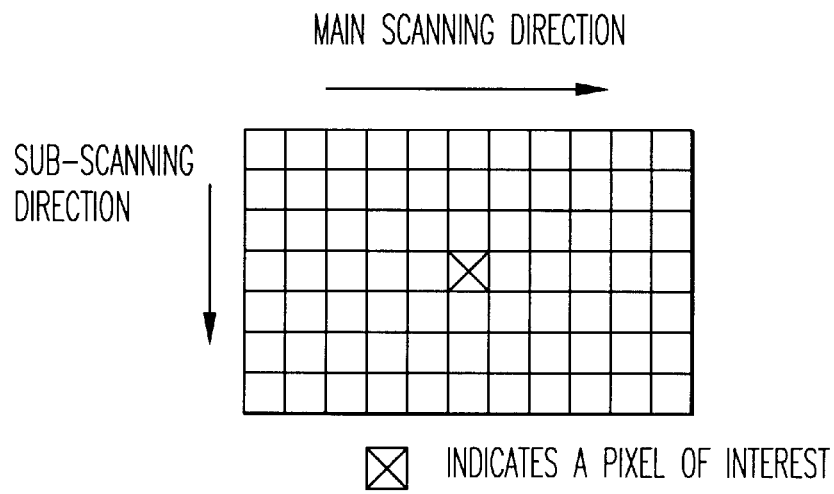
FIG. 5 is a diagram for indicating a size of image data of a two-dimensional space extracted by the matrix window illustrated in FIG. 4.

The matrix window 103 enables image data in a two-dimensional space, as illustrated in FIG. 5, to be simultaneously retrieved. In this example, the two-dimensional space is defined by an 11×7 matrix having 11 pixels in the main scanning direction and 7 lines in the sub-scanning direction.

It is understood that the size of the matrix varies depending on requirements of halftone detection and jagged line detection (larger one is employed), and that the 11×7 matrix is not a unique proper size.

Generally, the matrix often has a size of an odd number of pixels and an odd number of lines because a pixel of interest (indicated by "X" in FIG. 5) is positioned at the center of the matrix so as to detect a jagged line or a halftone region with reference to the pixel of interest.

Data subject to the halftone detection in the halftone detector 104 is image data once converted into a binary form.

The binarization may be implemented by a fixed threshold method, a dither method, an error diffusion method, and so on, as previously mentioned. Generally, a halftone image is produced by virtually represented data such as those generated by the dither or error diffusion processing. Even when a fixed threshold is used to generate binary image data, a shaded portion of a document or signal noise possibly introduced into image data during the processing may result in pseudo halftone images. In any case, the form of data representing such a halftone image is indefinite.

In this embodiment, the halftone detection is performed in order to approach an image represented by binary data to a halftone image represented by a multi-value gradation data as close as possible, when binary data is used in a printer even having a multi-value representing function for the purpose of reducing a required memory capacity.

The binarization relying on the dither processing causes black dots to regularly appear on a resulting image. On the other hand, the binarization relying on the error diffusion processing causes black dots to randomly disperse on a resulting image. The same is applied when a halftone portion is produced in consequence of the fixed threshold processing.

In any case, a halftone portion is such that black dots do not collectively appear in a direction and relatively evenly disperse over the halftone portion, unlike characters or drawings. In this embodiment, this characteristic is utilized to detect a halftone portion.

Figure 6:
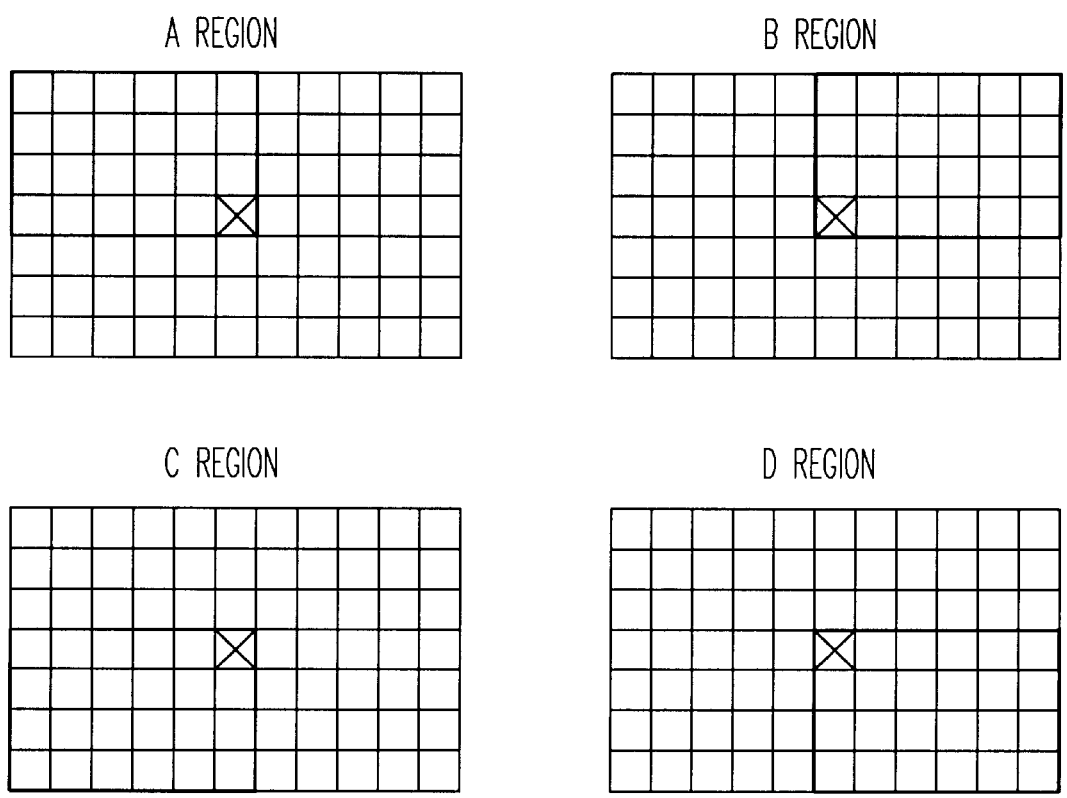
FIG. 6 is a diagram showing an example of how the image data of the two-dimensional space illustrated in FIG. 4 is divided into four regions.

Referring next to FIG. 6, image data representing a two-dimensional space extracted by the matrix window 103 is divided into a predetermined number of regions, for example four regions A–D indicated by thick lines. Each region is formed to include a pixel of interest.

The number of black pixels is counted in each region, and a maximum value and a minimum value are compared in the four regions to determine a halftone region based on the following criteria (1)–(2).

(1) When the difference between the maximum value and the minimum value in the extracted two-dimensional space is equal to less than a threshold value TH1, the space is determined to be a halftone region.

(2) When the difference between the maximum value and the minimum value is larger than the threshold value TH1, and the difference in the number of black pixels between the region A and the region D is equal to or less than a threshold value TH2, and the difference in the number of black pixels between the region B and the region C is equal to or less than the threshold value TH2, the extracted two-dimensional space is determined to be a halftone region.

In this embodiment, the jagged line detection performed by the pattern recognition unit 105 is given priority to the halftone detection in either of the cases (1), (2), so that a two-dimensional space is not determined to be a halftone region even if it falls under the criterion (1) or (2) when a jagged line is detected in that space.

However, in other embodiments, the halftone determination may be given priority depending on purposes of utilizing the present invention or depending on the accuracy of the detection.

Also, while the embodiment illustrated in FIG. 6 employs a window having a size of 11×7 and regions respectively having a size of 6×4, the present invention is not limited to these specific sizes, and optimal sizes of the window and the respective regions may be determined for each system. Also, the threshold values TH1, TH2 may be met at optimal values depending on employed matrix sizes, and so on.

Next, the multi-value filter 107 will be described.

While the jagged line correction technique utilizes multi-value data for smoothing jagged oblique lines, multi-value processing for the halftone detector 104 is utilized for gradation representation.

From the fact that the pseudo halftone processing represents the gradation based on the ratio of black pixels to white pixels within an area of interest, a gradation level of a pixel of interest can be predicted from the black pixel ratio over pixels surrounding the pixel of interest. The multi-value processing performed in the multi-value as filter 107 is based on the black pixel ratio.

Specifically, the level of a pixel of interest is calculated through a filter as illustrated in FIG. 7A or 7B, where "1" represents a black pixel and "0" represents a white pixel. An exemplary 5×3 multi-value filter illustrated in FIG. 7A has a total of 16 coefficients so that a calculated level of a pixel of interest takes a value in a range of 0–16. Therefore, 17-level gradation is provided by the multi-value filter of FIG. 7A. On the other hand, an exemplary 3×3 multi-value filter illustrated in FIG. 7B has a total of nine coefficient so that a calculated level of a pixel of interest takes a value in a range of 0–9. Therefore, ten-level gradation is provided by the multi-value filter of FIG. 7B.

While the number of levels of gradation is increased as a size of the multi-value filter 107 increases, a larger size multi-value filter 107 causes unclear images since the multi-value filter 107 basically functions as a smoothing filter. Therefore, a multi-value filter 107 having a minimally required size should be selected. Specifically, the size of the multi-value filter 107 must be smaller than the matrix size for detecting a halftone region.

FIG. 8 shows how a multi-value level is calculated using the multi-value filter 107 illustrated in FIG. 7A.

FIG. 9 conceptually illustrates an example of how a binarized halftone image portion is represented by multi-valued image data. For example, texture possibly caused by the error diffusion processing can be made less prominent.

Figure 10:
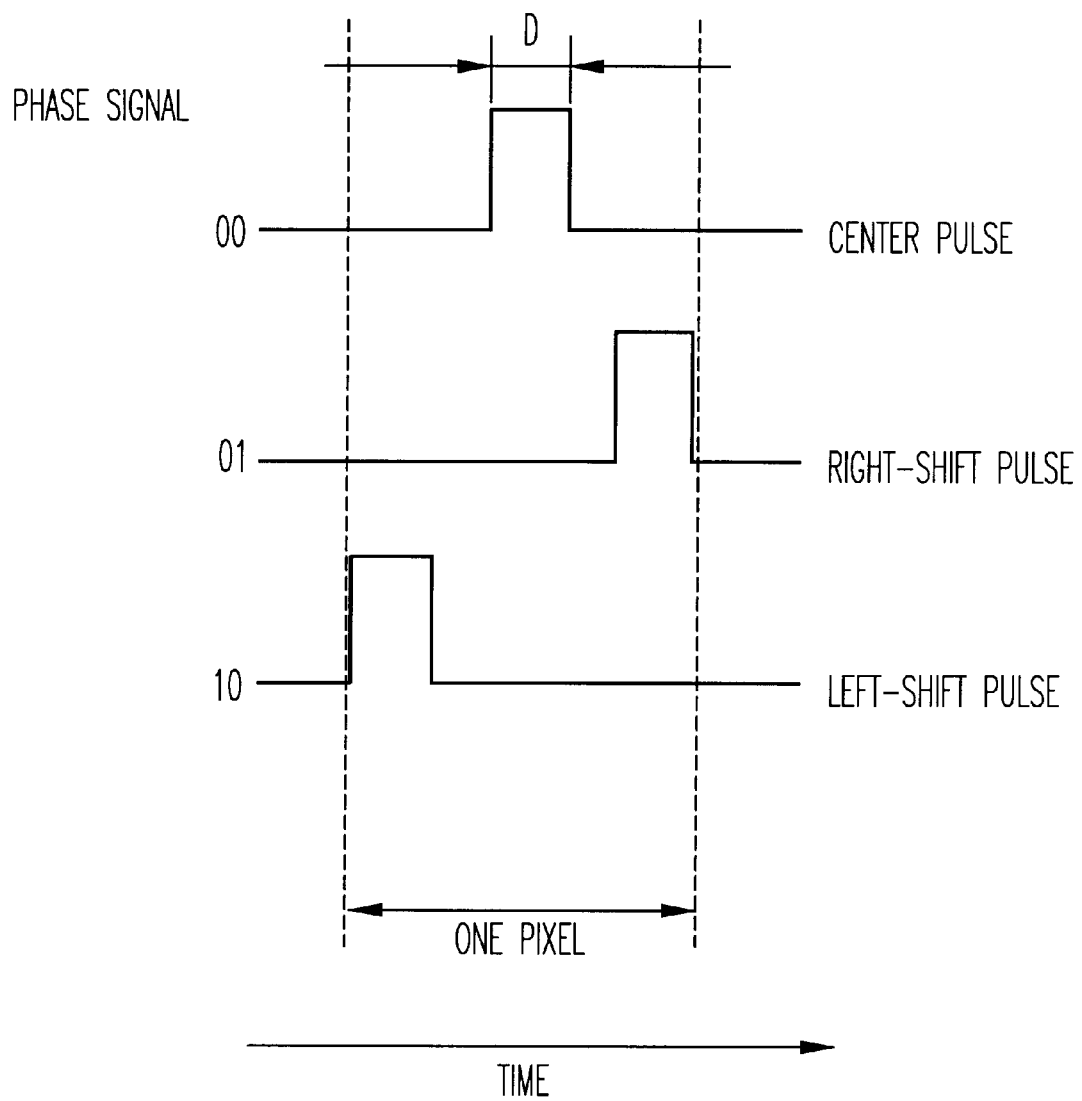
FIG. 10 is a diagram conceptually illustrating a method of controlling a laser diode writing signal using multi-value data.

FIG. 10 conceptually illustrates a method of controlling a laser diode writing signal using the multi-value data. While a PWM (pulse width modulation) control is described in particular with reference to FIG. 10, the same concept may be applied to a laser power control when considering how energy transmitted by a laser beam per pixel, i.e., a laser light amount, is distributed over a time axis.

With 2-bit phase signals "00", "01", "10", the phase of a driving pulse can be controlled to position at center, right-end, and left end. Particularly, these 2-bit signals may be effectively utilized for the jagged line correction depending on a surrounding situation.

In some cases, a halftone image may be more easily represented if the energy is dispersed. In this event, the center pulse may be effectively applied to all pixels (although the left-shift or the right-shift pulse may also assigned, the same pulse must be applied to all pixels).

However, when the energy is too finely dispersed in electrophotographic processes (development, transfer, and so on), defects due to variations in rotation of the drum and low quality development may become more prominent on a resulting image. Thus, the extremely finely dispersed energy may cause inconveniences to the contrary. In such a case, the left-shift pulse and the right-shift pulse may be alternately applied to every other pixels in the main scanning direction to link adjacent pixels, thereby providing a stable gradation characteristic.

Unlike the jagged line correction, the pulse phase may be periodically determined only based on the position irrespective of surrounding situations.

The laser diode driving pulse has a full width corresponding to the width of a pixel, which is divided by the resolution of an LD driver. In this embodiment, an LD driver for 256 levels of gradation is used, and an 8-bit luminance signal is passed to the LD control circuit 20.

Since the number of levels for representing a halftone image is 17 in the aforementioned example of a 5×3 filter and ten in the example of a 3×3 filter (the number of levels also depends on the number of coefficients), the range of the levels 0–16 and 0–9 must be converted into a range of levels represented by the 8-bit luminance signal. This processing is the same as the replacement of binary data "1" and "0" with "FF" and "00". Table 1 shows an example of conversion results when the 5×3 filter is used.

TABLE 1

| Luminance Signal | Pulse Width D (x1x16 pixels) |
| --- | --- |
| 00h | 0 |
| 08h | 1 |
| 11h | 2 |
| 22h | 3 |
| 33h | 4 |
| 44h | 5 |
| 55h | 6 |
| 66h | 7 |
| 77h | 8 |
| 88h | 9 |
| 99h | 10 |
| AAh | 11 |
| BBh | 12 |
| CCh | 13 |
| DDh | 14 |
| EEh | 15 |
| FFh | 16 |

Next, the determination unit 109 arranged in the multi-value processing unit 101 will be described referring back to FIG. 3. The multi-value processing unit 101 illustrated in FIG. 3 includes: two detecting units, i.e., the halftone detector 104 and the pattern recognition unit 105 for detecting a jagged line; and three kinds of multi-value processing units including a multi-value processing unit implemented by a jagged line correction using the pattern memory 106, a multi-value processing unit implemented by the multi-value filter 107, and a multi-value processing unit implemented by the FF/00 converter 108.

In this embodiment, the determination unit 109 selects a determination condition by setting an associated mode using a mode setting signal. A mode may be set in accordance with a particular purpose of applying the present invention. For example, when a digital copying apparatus is provided with an image quality setting key on a manipulation panel and a switching function which permits an operator to switch between a character mode, a photograph mode, a character/photograph hybrid mode, and so on, depending on whether a document to be copied is a document prevalently including characters, a document prevalently including photographs, a document equally mixed with characters and photographs, and so on, the determination unit 109 can set a mode in association with the image quality setting function.

In this way, it is possible to select an appropriate determination condition for the character mode, the photograph mode and the character/photograph mode.

In addition, when the memory unit 100 in FIG. 2 is used as a memory unit for converting character data transferred from a host computer into bit image data such that the converted bit image data is transferred to the LD control circuit 20 for producing a printed output, an appropriate determination condition may be selected for this particular case.

As will be apparent from the foregoing description of the embodiment, the present invention has the following advantages.

(1) Since binary image data is stored in the memory unit 100, the capacity of the memory unit 100 can be reduced. A halftone region is determined from binary image data read from the memory unit 100, so that the determination can be made with a less amount of data and in a simple configuration. In addition, by previously determining whether or not a jagged oblique line should be corrected, a halftone portion is detected in an improved accuracy. Further, a higher image quality can be provided without wasting the high gradation representation capability of a laser printer.

(2) The present invention can support a variety of modes such as a character mods, a photograph mode, a character/photograph hybrid made, and so on, possessed by a digital copying apparatus. In addition, the setting can be readily changed in response to a special request associated with a particular system configuration, for example, a request from a host computer to perform a jagged line correction during an arrangement of characters. In other words, when a halftone correction is not required, the setting may be changed with a simple operation.

(3) Since the invention handles an image represented by binary data which has once undergone pseudo halftone processing, it is possible to eliminate complicated processing, such as processing for detecting a shading pattern including a large number of lines such as 100 or 200 lines possibly causing the occurrence of moire. Since line images are separately detected and processed, a simple configuration can be realized.

(4) A texture possibly resulting from error diffusion binarization or the like can be made less prominent. Since the present invention is intended to process pseudo halftone images such as those produced by dither processing, error diffusion processing, random noise, and so on, a higher image quality can be ensured even with binarized image data.

In conclusion, the digital copying apparatus according to the present invention, as has been described, can readily detect a portion requiring a jagged line correction to apply the jagged line correction to such a portion while reducing a necessary capacity of a memory for storing image data transduced from a read document, and produce a halftone image in a gradation representation suitable thereto. Thus, a higher image quality can be provided corresponding to a variety of modes including a character mode, a photograph mode, a character/photograph hybrid mode, and so on.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent application JP-A P08-046423 filed in the Japanese Patent Office on Mar. 4, 1996, the entire contents of which are hereby incorporated by reference.

What is claimed as new and desired to be secured by letters Patent of the United States is:

1. An image forming apparatus comprising:
    image input means for inputting a document image to generate an electrical image signal representing the document image;
    signal processing means for signal processing said electrical image signal generated by said image input means; and image output means for outputting an image in accordance with the image signal processed by said signal processing means;

wherein said signal processing means comprises:

binarizing means for binarizing said electrical image signal generated by said image input means;

memory means for storing binarized image data generated by said binarizing means;

pattern recognition means for performing pattern recognition to determine whether or not said electrical image signal includes a pixel which requires a jagged line correction based on said binarized image data read from said memory;

jagged line correction executing means for executing the jagged line correction to a pixel determined to require the jagged line correction;

halftone detecting means for detecting a halftone region from said binarized image data;

multi-value processing means including a multi-value filter for converting said binarized image data into multi-valued image data; and output selecting means for selectively outputting output image data of said jagged line correction means and output image data of said multi-value processing means based on a determination result provided by said pattern recognition means and a detection result provided by said halftone detecting means.

2. The image forming apparatus according to claim 1, wherein said output selecting means includes:

a plurality of determination means for selecting output image data based on a determination result provided by said pattern recognition means and a detection result provided by said halftone detecting means; and mode setting means for selectively setting one of said plurality of determination means.

3. The image forming apparatus according to claim 1, wherein said halftone detecting means includes:

means for arranging binarized image data read from said memory means in a two-dimensional matrix having a size of M×N, where M and N are odd integers;

means for dividing said M×N matrix region into a predetermined number of sub-regions, each of said predetermined number of sub-regions including a pixel of interest located at a center of said M×N matrix region, and for counting a number of black pixels in each of said predetermined number of sub-regions;

first determination means for determining whether or not said pixel of interest falls under a halftone portion based on a difference between maximum and minimum values of the number of black pixels in said predetermined number of sub-regions;

second determination means for determining whether or not said pixel of interest falls under a halftone portion based on a difference in a number of black pixels between two pairs of diagonally opposing ones of said predetermined number of sub-regions; and means for finally determining whether or not said pixel of interest falls under a halftone portion from determination results of said first and second determination means.

4. The image forming apparatus according to claim 3, wherein the predetermined number of sub-regions is four.

5. The image forming apparatus according to claim 2, wherein said halftone detecting means includes:

means for arranging binarized image data read from said memory means in a two-dimensional matrix having a size of M×N, where M and N are odd integers;

means for dividing said M×N matrix region into a predetermined number of sub-regions, each of said predetermined number of sub-regions including a pixel of interest located at a center of said M×N matrix region, and for counting a number of black pixels in each of said predetermined number of sub-regions;

first determination means for determining whether or not said pixel of interest falls under a halftone portion based on a difference between maximum and minimum values of the number of black pixels in said predetermined number of sub-regions;

second determination means for determining whether or not said pixel of interest falls under a halftone portion based on a difference in a number of black pixels between two pairs of diagonally opposing ones of said predetermined number of sub-regions; and means for finally determining whether or not said pixel of interest falls under a halftone portion from determination results of said first and second determination means.

6. The image forming apparatus according to claim 5, wherein the predetermined number of sub-regions is four.

7. The image forming apparatus according to claim 3, wherein:

said multi-value processing means comprises means for converting said binarized image data into multi-valued image data using a two-dimension multi-value filter having a size smaller than said two-dimensional matrix having the size of M×N, for arranging binarized image data therein; and said output selecting means selects and outputs multi-valued image data converted by said multi-value processing means for a pixel which is detected to belong to a halftone portion.

8. The image forming apparatus according to claim 5, wherein:

said multi-value processing means comprises means for converting said binarized image data into multi-valued image data using a two-dimension multi-value filter having a size smaller than said two-dimensional matrix having the size of M×N, for arranging binarized image data therein; and said output selecting means selects and outputs multi-valued image data converted by said multi-value processing means for a pixel which is detected to belong to a halftone portion.

9. An image forming apparatus, comprising:

an input device for inputting a document image to generate an electrical image signal representing the document image;

a signal processor for signal processing said electrical image signal generated by said input device; and an output device for outputting an image in accordance with the image signal processed by said signal processor;

wherein said signal processor comprises:

a binarizing circuit for binarizing said electrical image signal generated by said input device;

a memory for storing binarized image data generated by said binarizing circuit;

a pattern recognition circuit for performing pattern recognition to determine whether or not said electrical image signal includes a pixel which requires a jagged line correction based on said binarized image data read from said memory;

a jagged line correction executing circuit for executing the jagged line correction to a pixel determined to require the jagged line correction;

a halftone detecting circuit for detecting a halftone region from said binarized image data;

a multi-value processing circuit including a multi-value filter for converting said binarized image data into multi-valued image data; and an output selecting circuit for selectively outputting output image data of said jagged line correction circuit and output image data of said multi-value processing circuit based on a determination result provided by said pattern recognition circuit and a detection result provided by said halftone detecting circuit.

10. The image forming apparatus according to claim 9, wherein said output selecting circuit includes:

a plurality of determination circuits for selecting output image data based on a determination result provided by said pattern recognition circuit and a detection result provided by said halftone detecting circuit; and a mode setting circuit for selectively setting one of said plurality of determination circuits.

11. The image forming apparatus according to claim 9, wherein said halftone detecting circuit includes:

a circuit for arranging binarized image data read from said memory in a two-dimensional matrix having a size of M×N, where M and N are odd integers;

a circuit for dividing said M×N matrix region into a predetermined number of sub-regions, each of said predetermined number of sub-regions including a pixel of interest located at a center of said M×N matrix region, and for counting a number of black pixels in each of said predetermined number of sub-regions;

a first determination circuit for determining whether or not said pixel of interest falls under a halftone portion based on a difference between maximum and minimum values of the number of black pixels in said predetermined number of sub-regions;

a second determination circuit for determining whether or not said pixel of interest falls under a halftone portion based on a difference in a number of black pixels between two pairs of diagonally opposing ones of said predetermined number of sub-regions; and a circuit for finally determining whether or not said pixel of interest falls under a halftone portion from determination results of said first and second determination circuits.

12. The image forming apparatus according to claim 11, wherein the predetermined number of sub-regions is four.

13. The image forming apparatus according to claim 10, wherein said halftone detecting circuit includes:

a circuit for arranging binarized image data read from said memory in a two-dimensional matrix having a size of M×N, where M and N are odd integers;

a circuit for dividing said M×N matrix region into a predetermined number of sub-regions, each of said predetermined number of sub-regions including a pixel of interest located at a center of said M×N matrix region, and for counting a number of black pixels in each of said predetermined number of sub-regions;

a first determination circuit for determining whether or not said pixel of interest falls under a halftone portion based on a difference between maximum and minimum values of the number of black pixels in said predetermined number of sub-regions;

a second determination circuit for determining whether or not said pixel of interest falls under a halftone portion based on a difference in a number of black pixels between two pairs of diagonally opposing ones of said predetermined number of sub-regions; and a circuit for finally determining whether or not said pixel of interest falls under a halftone portion from determination results of said first and second determination circuits.

14. The image forming apparatus according to claim 13, wherein the predetermined number of sub-regions is four.

15. The image forming apparatus according to claim 11, wherein:

said multi-value processing circuit comprises a circuit for converting said binarized image data into multi-valued image data using a two-dimension multi-value filter having a size smaller than said two-dimensional matrix having the size of M×N for arranging binarized image data therein; and said output selecting circuit selects and outputs multi-valued image data converted by said multi-value processing circuit for a pixel which is detected to belong to a halftone portion.

16. The image forming apparatus according to claim 13, wherein:

said multi-value processing circuit comprises a circuit for converting said binarized image data into multi-valued image data using a two-dimension multi-value filter having a size smaller than said two-dimensional matrix having the size of M×N for arranging binarized image data therein; and said output selecting circuit selects and outputs multi-valued image data converted by said multi-value processing circuit for a pixel which is detected to belong to a halftone portion.

* * * * *